United States Patent [19]

Ogawa

[11] 4,133,760

[45] Jan. 9, 1979

[54] KNOCKDOWN TYPE FILTERING DEVICE

[76] Inventor: Yonekichi Ogawa, 4-5-3 Nakameguro, Meguro-ku, Tokyo, Japan

[21] Appl. No.: 811,676

[22] Filed: Jun. 29, 1977

[30] Foreign Application Priority Data

Jul. 2, 1976 [JP] Japan .................................. 51/88674

[51] Int. Cl.² .............................................. E04H 3/16
[52] U.S. Cl. ......................................... 210/169; 119/3
[58] Field of Search .............. 210/169, 347, 447, 484, 210/485; 55/484, 500; 119/3

[56] References Cited

U.S. PATENT DOCUMENTS

| | | | |
|---|---|---|---|
| 1,810,965 | 6/1931 | Hopkins | 210/484 X |
| 2,016,033 | 10/1935 | Christafferson | 55/484 |
| 3,171,808 | 3/1965 | Todd | 210/347 X |
| 3,430,771 | 3/1969 | Dreher | 210/485 X |
| 3,848,567 | 11/1974 | Gaiber, Jr. | 210/169 |
| 3,864,262 | 2/1975 | Lany et al. | 210/169 |
| 3,957,634 | 5/1976 | Orensten et al. | 210/169 |
| 3,964,890 | 6/1976 | Bonn | 55/484 |
| 4,048,073 | 9/1977 | Rose | 55/484 |
| 4,049,406 | 9/1977 | Rivers | 55/484 |

*Primary Examiner*—Theodore A. Granger
*Attorney, Agent, or Firm*—Haseltine, Lake & Waters

[57] ABSTRACT

A filtering device for use in a water or aquarium tank for fish such as goldfish. The device comprises a plurality of filtering units disposed within the water tank, a connecting pipe for connecting the filtering units, a unit for introducing waste water into the filtering units, and a communicating member for introducing water into each of the filtering units. The filtering units may be detachably connected by a connecting pipe depending on the capacity of the water tank. The connecting pipe is formed with a number of perforations and interiorly formed with a water passage.

7 Claims, 3 Drawing Figures

KNOCKDOWN TYPE FILTERING DEVICE

BACKGROUND OF THE INVENTION

1. Field of the Invention

This invention relates to a knockdown type filtering device for use in a water tank for fish such as goldfish, tropical fish and the like.

2. Description of the Prior Art

In prior art filtering apparatus used in a water tank for goldfish, tropical fish and the like, when the flow velocity of water to be filtered is increased in order to enhance the filtering ability, not only chlorellas required for raising fish but bacteria which eat vegetable plankton are destroyed to allow propagation of the vegetable plankton and as a result, the water in the water tank becomes impure, whereas when the flow velocity of water is adjusted, sufficient filtering action cannot be attained. In any case, it has been extremely difficult to raise fish for a long period of time while maintaining the water within the water tank clean without replacing the water or cleaning the tank.

SUMMARY OF THE INVENTION

It is therefore an object of the present invention to provide a knockdown filtering device of simple construction which can readily increase the filtering ability without increasing the flow velocity of water to be filtered to sufficiently propagate chlorellas and bacteria which eat vegetable plankton, thereby overcoming those difficulties noted above.

BRIEF DESCRIPTION OF THE DRAWINGS

In the drawing:
The drawings show one embodiment of a filtering device in accordance with the present invention.

DESCRIPTION OF THE PREFERRED EMBODIMENT

Figure 1:
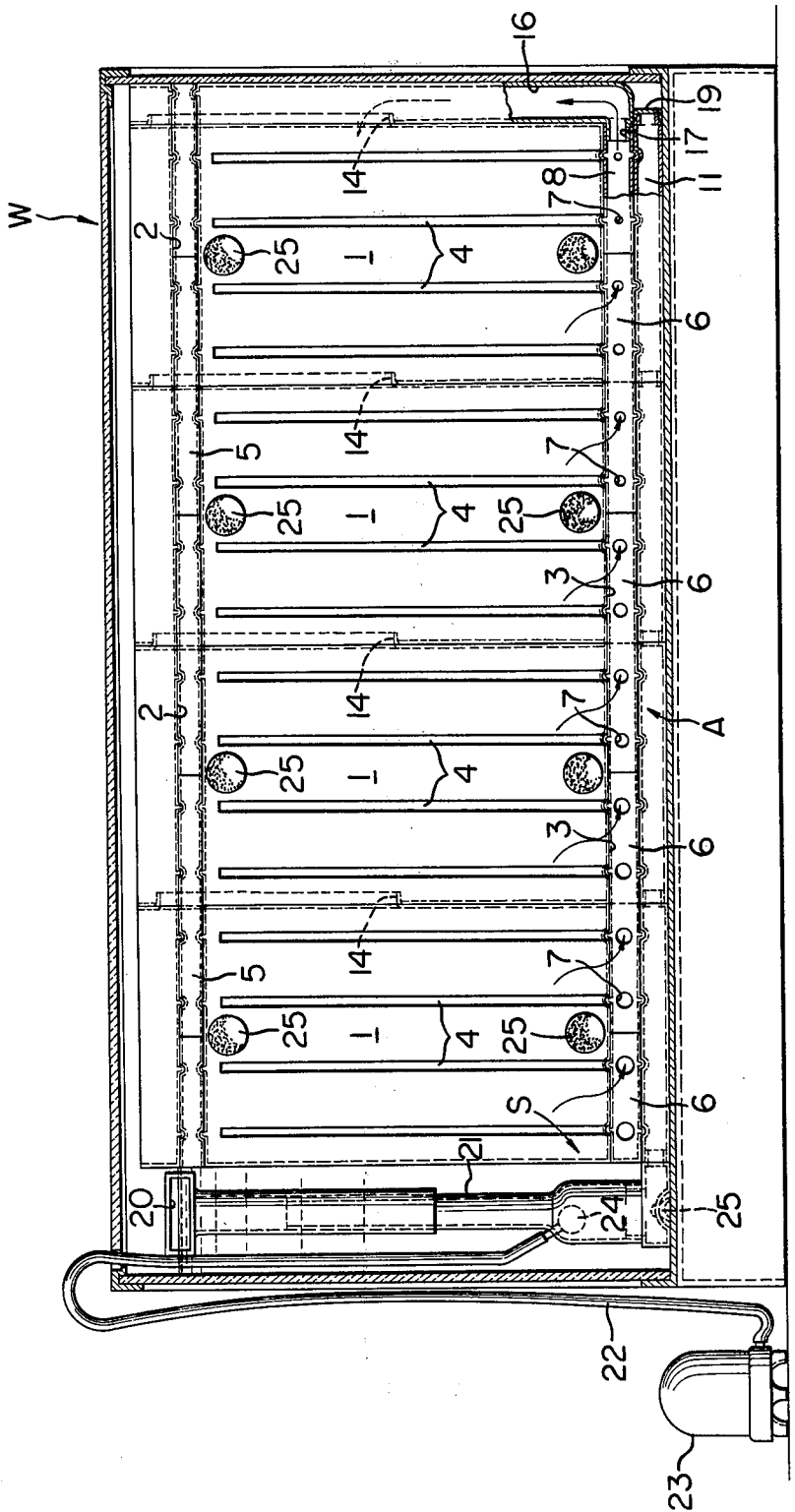
FIG. 1 is a front view showing the filtering device within a water tank.
Figure 2:
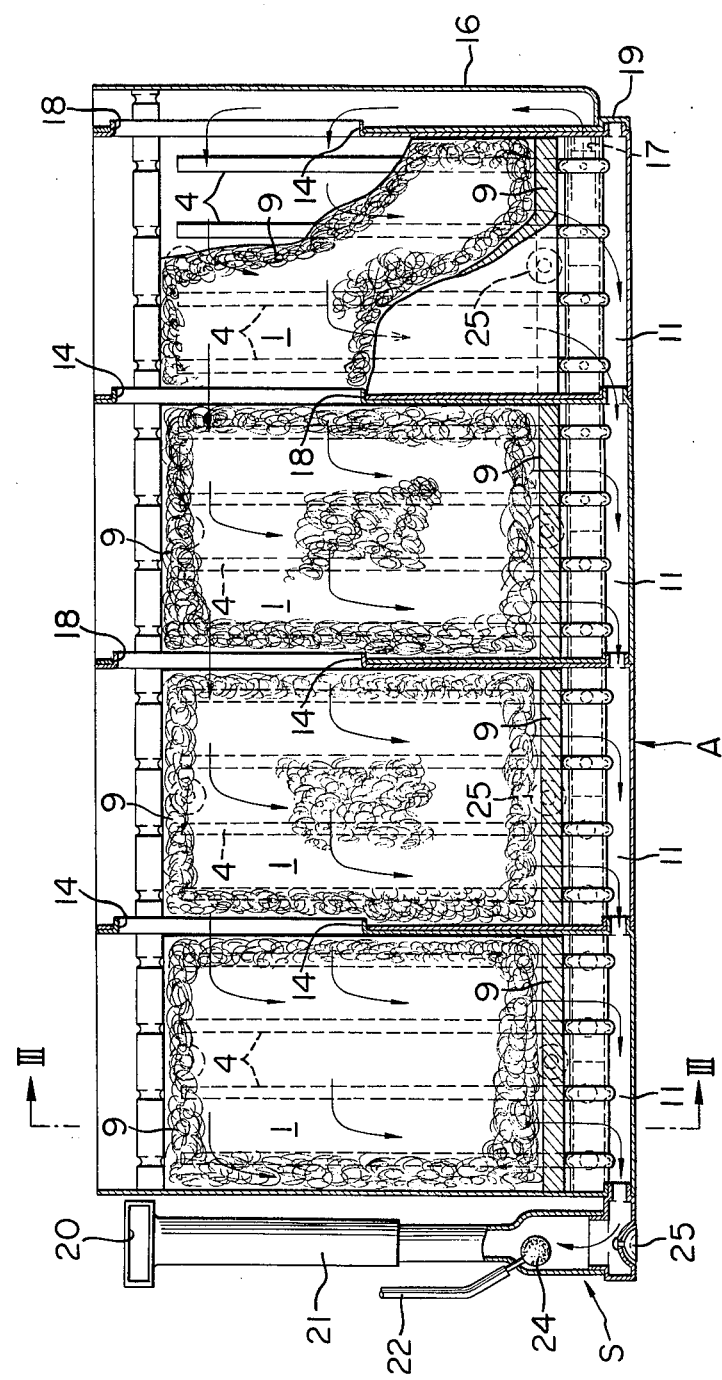
FIG. 2 is a partly longitudinal sectional side view of the filtering device showing the flow of water by means of arrows.
Figure 3:
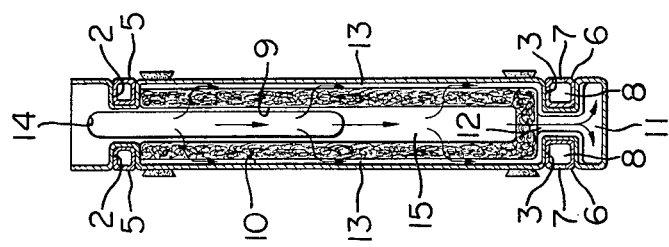
FIG. 3 is a sectional view taken along line III—III in FIG. 2.

One embodiment of the present invention will now be described with reference to the accompanying drawings. A filtering assembly A received within a water tank W may be formed of plastic material or the like and has a plurality of flat box-shaped filtering units 1 with upper ends thereof detachably connected thereto. Each filtering unit 1 is formed at the front and rear surfaces thereof with a pair of -shaped upper and lower connecting grooves 2 and 3 in concave fashion extending laterally close to upper and lower ends thereof, several strips of ribs 4 longitudinally extending from the lower connecting groove 3 toward the upper connecting groove 2 in equally spaced relation. Upper and lower connecting pipes 5 and 6 which are hollow and have a square section are fitted on the upper and lower connecting grooves 2 and 3, respectively, so that the plurality of filtering units 1 may be detachably connected. It will be noted that if sufficient connecting strength is obtained only by the provision of the lower connecting pipes 6 when the filtering units 1 are connected, the upper connecting pipes 5 may be omitted.

The lower connecting pipe 6 is interiorly formed with a water passage 8 and has one side wall surface formed with a number of holes 7 through which the water within the water tank W may pass into the water passage 8.

Within the filtering unit 1 and above the lower connecting groove 3 there is formed a filtering chamber or compartment 10 of U-shape filled with plate-like filtering material 9 of plastic or the like. At the bottom of the filtering unit 1 there is formed a drain passage 11 whose opposite ends are open, the drain passage 11 being communicated through a communicating passage 12 between the inner surfaces of the lower connecting grooves 3 with a gap 13 formed between the outer surface of the filtering material 9 and the front and rear walls of the filtering chamber 10. The filtering chamber 10 has opposite walls at the upper central portion of which there are provided communicating holes 14 so that when the filtering units 1 are connected, adjacent communicating holes 14 are fitted with each other to maintain the filtering chamber 10 in each filtering unit 1, that is, an internal space 15 of the filtering material 9 disposed in U-shaped fashion therein in communicating reaction.

A hollow communicating member 16, which is arranged on one side of the plurality of filtering units 1 connected with one another by the upper and lower connecting pipes 5 and 6, is connected to an open end of the pair of lower connecting pipes 6 at an inlet 17 formed at opposite sides at the lower end and is connected to a communicating hole 14 in a side wall of the filtering chamber 10 of the adjacent filtering unit 1 at an upper outlet 18 so as to connect the water passage 8 in the lower connecting pipe 6 with the internal space 15 of the filtering material 9 received within the filtering chamber 10.

The drain passage 11 formed at the lower end of the filtering unit 1 has an end adjacent the communicating member 16 closed by a cap 19 whereas the other end thereof is connected to an air lift device S, which will be described later.

The air lift device S comprises a vertical pipe 21 with an open upper end 20 and a lower end connected to the drain passage 11, the pipe 21 having a base portion on which is mounted an air stone 24 connected by means of a flexible tube 22 to an air pressure source 23 as air pump.

In the figures, reference numeral 25 designates attractive discs for locking the filtering assembly A or water pipe 21 against the inner surface or bottom surface of the water tank W.

In operation of the knockdown filtering device in accordance with the present invention, the filtering device built-up by using a suitable number of filtering units depending on capacity of the water tank W is first locked against the back or inner side of the bottom of the water tank W. Thereafter, when the air pump 23 is started to inject air into the pipe 21 for allowing water therein to be discharged through the open upper end 20, waste water within the water tank W passes through the water receiving holes 7 in the side of the lower connecting pipe 6 into the water passage 8 therein and the water flows through the communicating member 16 and is successively introduced from the communicating hole 14 into the internal space 15 of the filtering material 9 arranged in U-shaped fashion within the filtering chamber 10 of each filtering unit 1. The waste water then permeates the front and rear surfaces of the filtering material and is filtered, passes into the gap portion 13 formed outside thereof, and further passes through the communicating passage 12 into the drain passage 11, from which the water is introduced into the pipe 21 and returned to the water tank W through the upper end 20 in the form of purified water. Since the waste water introduced into the internal space 15 of the filtering material within the filtering chamber 10 is divided into two flows to be filtered by the front and rear surfaces of the filtering material 9, a greater filtering ability than the capacity for receiving the filtering material in the filtering chamber 10 is obtained, and in addition, since the water air lift S is connected to the drain passage 11 in communication with the filtering chamber 10 on the side remote from the outlet 18 of the communicating member 16 for feeding waste water to the filtering chamber 10, the waste water is successively passed from the side remote from the air lift S into the filtering chamber 10 adjacent thereto to receive uniform filtration by means of the filtering material within the chamber 10. Accordingly, the waste water is not subjected to concentrated filtering action by a specific filtering unit, and hence, the filtering material 9 may be used for long periods of time without the necessity of replacement or washing thereof and a plurality of filtering units 1 may be used to increase the filtering ability without any inconvenience.

Further, the opening areas of the water receiving holes 7 may be made gradually smaller from the side remote from the air lift device S toward that adjacent thereto, that is, from the side smaller in the water absorbing force toward that greater in said force to obtain substantially uniform water flow over the full length of the lower connecting pipe 6.

In accordance with the present invention, as described above, the plurality of filtering units 1 may be detachably be connected by the connecting pipe 6 to thereby obtain a suitable filtering ability depending upon the capacity of the water tank W so that the filtering ability sufficient to purify the interior of the water tank W is maintained while the flow velocity of water to be filtered may be made relatively small to expedite propagation of chlorellas serving as food for the fish, bacteria for cleaning the interior of the water tank W, and the like. In addition, since the connecting pipe 6 is formed with a number of water receiving holes 7 and interiorly formed with a water passage 8, the connecting means for the filtering units 1 and the water passage are no longer necessary to be constituted separately, which results in a simple construction. Moreover, the filtering chamber 10 in filtering unit 1 encases therein perpendicularly extending U-shaped plate-like filtering material 9 leaving gaps through which water passes in a manner such that the filtering surfaces of the filtering material 9 are opposedly disposed through said gaps, and hence, unfiltered water passed into the filtering chamber 10 may be divided into two flows, which pass through the filtering surfaces approximately twice the sectional area of the filtering chamber for filtration, thus materially increasing the filtering effect. Further, the provision of the broad filtering surfaces as previously mentioned provides a sufficient filtering ability even if the flow velocity of water, that is, the flow rate per unit time is decreased, and as a consequence, propagation of bacteria such as chlorellas is expedited within the filtering material 9 as the velocity of flow decreases (bacteria are normally generated at a velocity of flow less than about 5 m/min.). These bacteria may serve as the raw food for fish and at the same time, destroy residual organic matter, feces or the like, helping to purify the water.

Further, solid matter such as feces and unfiltered leaves may readily be moved down along the filtering surfaces of the vertical filtering material 9 and gradually settled to prevent meshes of the filtering material 9 from being clogged, and therefore, there always obtains a good filtering and eliminates frequent replacement of filtering material as is involved in the prior art filtering devices of the type as described.

What is claimed is:

1. A knockdown filtering device for use in a water tank comprising a plurality of filtering units, a connecting pipe on which said filtering units are detachably supported in adjacent parallel relation, said connecting pipe having openings for receiving waste water in said tank, water inlet means coupled to said connecting pipe at one end thereof for introducing the waste water to said filtering units for flow therethrough in succession, a common drain passage communicating with said filtering units for receiving purified water therefrom, and air lift means coupled to said drain passage for circulation of the purified water back into the tank, each of said filtering units comprising a filtering chamber filled with filtering material and an outlet connecting said filtering chamber with said drain passage, said filtering chambers having openings for communication of one chamber with an adjacent chamber for flow of water from the inlet means through said chambers, each of said chambers being provided with a groove, said connecting pipe being detachably fitted in the grooves of adjacent chambers to extend therealong for assembly of the chambers on said pipe, said common drain passage being formed by individual drain passages provided in said chambers below said groove, which drain passages are assembled in communicating relation when the chambers are mounted on said connecting pipe in communicating relation with one another.

2. A filtering device as claimed in claim 1 wherein two of said grooves are provided in said chamber in opposition to one another and two of said connecting pipes are provided, one for each groove.

3. A filtering device as claimed in claim 1 wherein the filter material in each chamber is arranged in U-shape and forms a space with the wall of the chamber, the water to be purified passing through the filter material into said space, said space communicating with the individual drain passage of the respective chamber for flow of purified water thereto.

4. A filtering device as claimed in claim 3 wherein said drain passage is disposed proximate the bottom of the tank.

5. A filtering device as claimed in claim 3 wherein said filtering material comprises plate-like filtering material.

6. A filtering device as claimed in claim 3 wherein the openings in the filtering chamber for flow of water therethrough is disposed between the branches of the U-shape of the filter material so that water flow through the filter material is divided and passes through the branches of the filter material to said space.

7. A filtering device as claimed in claim 6 wherein said openings are disposed in the upper portion of said chambers.

* * * * *